United States Patent Office 3,516,456
Patented June 23, 1970

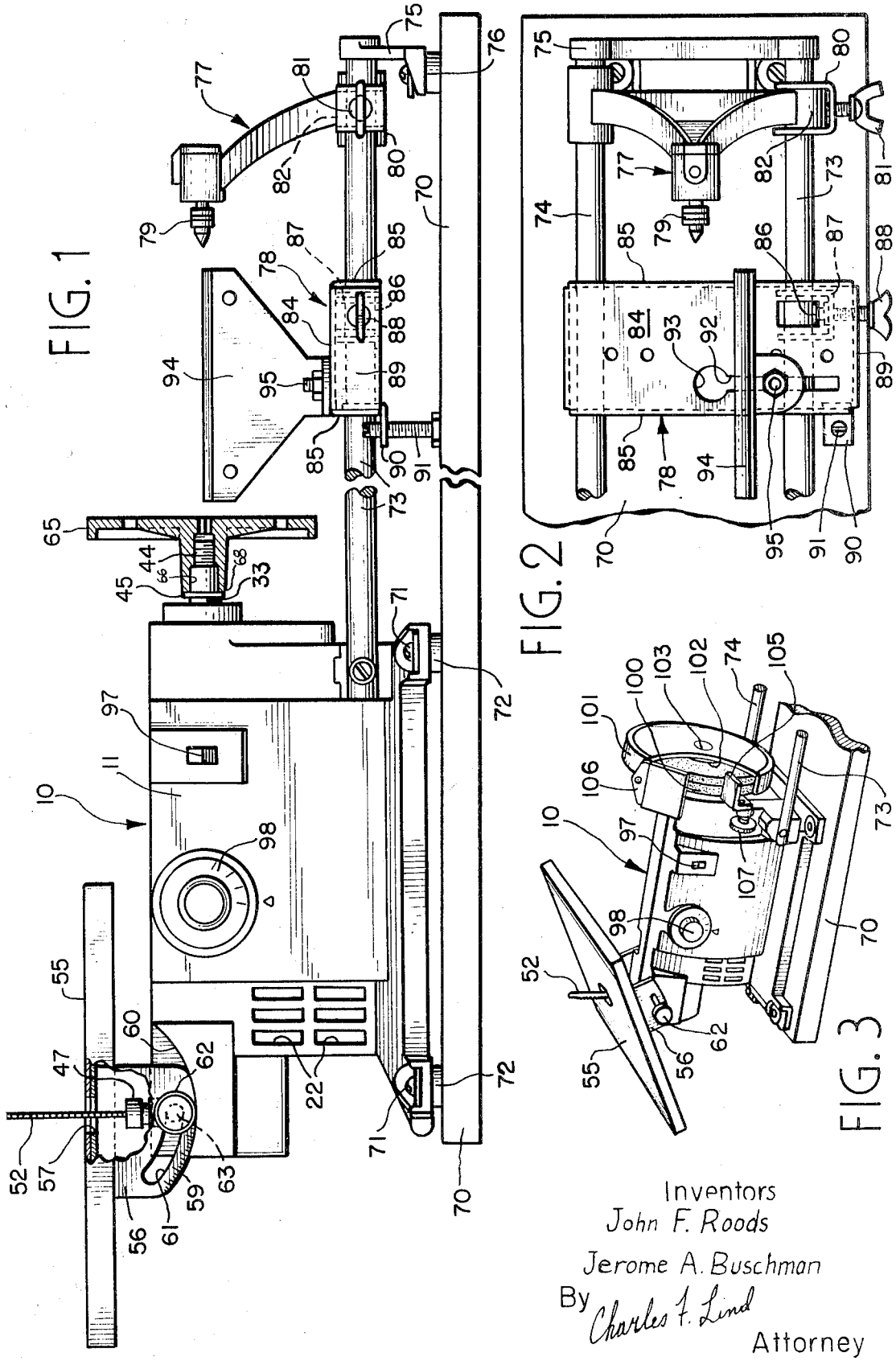

---

3,516,456
POWER LATHE
John F. Roods and Jerome A. Buschman, Jefferson City, Mo., assignors to McGraw-Edison Company, Elgin, Ill., a corporation of Delaware
Continuation of application Ser. No. 637,284, May 9, 1967. This application July 14, 1969, Ser. No. 841,311
Int. Cl. B23b *3/28*
U.S. Cl. 142—1                                                              7 Claims

ABSTRACT OF THE DISCLOSURE

A wood lathe having a power housing and frame mounted on a base and lathe ways therebetween, and tool holding and tailstock carriages on the lathe ways at least one having a foot means extendable therefrom against the base for laterally stabilizing the lathe ways.

---

This invention relates to a power wood lathe that can be fabricated economically while yet having the easy and accurate operations expected of a high cost lathe.

This application is a continuation of our copending application Ser. No. 637,284 filed May 9, 1967 and entitled "Combination Power Tool" and now Pat. No. 3,484,917.

The power tool of the present invention is a precision machine that can be made at an economical cost. The tool has a base member of wood or the like and upon which a power housing and opposing frame are mounted. Spaced lathe ways extend between the housing and frame and tool support and tailstock carriages are supported on the lathe ways to be adjusted along the length thereof as required. A foot element is extendably supported from a carriage to engage the base member for laterally stabilizing the lathe ways. A rotating element from the power housing can carry a face plate for use as a lathe with the ways, tailstock and tool support carriages provided, or the face plate can be replaced by a grinding wheel, buffing wheel, wire wheel or drum sander.

It is an object of this invention to provide an improved power lathe which is simple in operation, economical to manufacture and yet readily adaptable to handle all desired functions of a lathe.

It is a further object of this invention to provide a lathe unit with an improved tool support carriage.

These and other objects and advantages of this invention will become apparent from the following description when taken in connection with the accompanying drawings, wherein:

FIG. 1 is a side elevation of the tool of this invention with the lathe ways and base member interrupted;

FIG. 2 is a plan view of an end portion of the tool including the tailstock and carriage; and FIG. 3 is a perspective view of the power unit with the saw table mounted at an angle and a grinding wheel and guard replacing the face plate.

Referring to the drawings the power unit 10, illustrated in FIG. 1, supports therein a motor (not shown) and an output shaft 33 driven by the motor. The end of shaft 33 projects beyond the housing with a reduced diameter threaded terminal end portion 44 and an annular groove intermediate the distal end portion and the housing in which is received a spring retaining ring 45.

A ram assembly 47 is journaled within upper and lower ram bearings carried by the housing for vertical reciprocating movement. A drive connection (not shown) is made between the motor and the ram assembly to provide this powered movement. The upper portion of the ram receives and releasably retains a saw blade 52. A saw table 55 is mounted on the housing and is pivotable with respect thereto.

A generally U-shaped support member 56 is welded to the saw table with an aperture 57 through the U-shaped member bight portion and the saw table 55 disposed to be received about the upwardly extending saw element 52. The U-shaped member 56 has downwardly depending flange portions that have lower arcuate edge surfaces 59 that cooperate with arcuate surfaces 60, that partially define the recess at each transverse side of the housing exterior wall (as seen in FIG. 1), to permit saw table 55 to be positioned in a horizontal position or any of a series of inclined positions. The saw table is secured to the housing by a shoulder bolt 63 at each transverse side which extends through the arcuate slot 61 in the intermediate U-shaped member flange and is received in a threaded bore formed in the housing. This bolt has a knob 62 formed as an integral part thereof which may be manually manipulated to bring the bolt into engagement with and bind the flange of support 56 against the housing.

A face plate 65 is mounted on the threaded end 44 of shaft 33 with a cylindrical bore 66 slidably received over the unthreaded shaft end portion and a threaded bore which threadably receives the reduced cross-section threaded end portion to bring the axial end surface 68 of the face plate 65 into abutting relation with the retainer ring 45.

As seen in FIG. 1, the drive unit is mounted on a base member 70 by a series of screws 71 which pass through apertures in the housing portions and through resilient feet 72 to engage the base member. A pair of lathe ways 73, 74 are each bolted at one end to the housing and received at the opposite end in a rear brace member 75 which is supported on resilient feet 76 and secured to the base member 70. The lathe ways 73, 74 are formed of tubular steel members about which are supported a tailstock assembly 77 and a carriage assembly 78. The tailstock assembly 77 includes a center 79 coaxial with driven shaft 33 and releasably secured by a set screw to the balance of the tailstock assembly. The tailstock portion 82 which surrounds the way 73 is adjoined at either axial side by the flanges of a locking bracket 80 that has a threaded aperture in the web portion through which is received a thumb screw 81. The thumb screw 81 is manually advanced to engage the tailstock portion 82 and secure the tailstock in a predetermined position along the lathe ways 73, 74.

The carriage assembly 78 includes the carriage 84 which is formed of sheet material with the four marginal portions side flanged downwardly to form the vertical sides of the carriage. The lathe ways 73, 74 are journaled through apertures in the carriage side wall portions 85 to enable the carriage to be moved along ways 73, 74. A depending tab 86 pierced from the deck of the carriage extends downwardly immediately adjacent the lathe way 73. A generally U-shaped locking bracket 87 with apertures in the flange portions surrounds the ways at either side of the depending tab 86. A thumb screw 88, which extends through a bore in the carriage wall 89, is threadably received in a threaded aperture in the locking bracket web portion and is engageable with the downwardly depending tab 86 to selectively engage the tab 86 and force it to bear against the lathe way 73 to secure the carriage in a fixed position with respect to the way. An angle member 90 is welded to the carriage 84 and projects horizontally from the lower portion of the carriage. A carriage support bolt 91 is received in a threaded aperture of the bracket and may be advanced to engage the upper surface of the base member 70 to provide support for carriage assembly 78. An elongated slot 92 is formed in the top portion wall of carriage 84 with an enlarged opening 93 at the inward end.

A tool rest 94 is mounted on the carriage 84 and secured thereto by a bolt 95 which has a head portion that will pass through the enlarged opening 93 at the end of the slot and has a square shank portion adjacent the head with a dimension to allow it to be received in the slot 92 between the parallel side walls thereof to prevent rotation of the bolt and thus permit the tool support to be secured to, removed from or adjusted with respect to the carriage 84 without access to the head portion of bolt 95 underlying the carriage top wall.

As seen in FIG. 1 an on-off slide switch 97 is mounted on the housing to selectively interrupt the power supply to the power unit 10 and a three-position rotary switch 98 is provided for varying the speed of the motor.

The tool may also be used as a disk sander by adhering a sanding disk to the face plate 65, or the face plate 65 may be removed and any of a number of other rotating accessories substituted therefor such as a grinding wheel, a drum sander, a circular wire brush, or a buffing wheel. FIG. 3 shows the power unit with the saw table 55 disposed at an angle and face plate 65 replaced with a grinding wheel 100 for use as a bench grinder. A grinding wheel guard 101 has an annular collar which projects within and is secured concentrically within the housing collar which surrounds the driven shaft. Grinding wheel 100 is flanked by two flat washers 102 and is secured concentrically about the driven shaft 33 between the spring washer 45 (seen in FIG. 1) and a nut 103 threadably received about the threaded end 44 of the driven shaft. The grinder guard also carries a tool rest 105 secured thereto by a knob 107 and an eyeshield 106.

What is claimed is:

1. A power lathe, comprising a base member, a housing mounted to one end of the base member and a rear brace mounted to the opposite end of the base member, a shaft rotatably journaled within the housing and projecting from the housing toward the rear brace, a pair of lathe ways each supported between the housing and the rear brace parallel to one another and spaced from the base member, a tailstock carriage adjustably mounted on the lathe ways, a tool support carriage adjustably mounted on said lathe ways between the tailstock carriage and housing, and a foot carried by one carriage and adjustable to abut against the base member for restricting lateral movement of the lathe ways relative to the housing and rear brace.

2. A power lathe combination according to claim 1, wherein the foot is carried by the tool support carriage.

3. A power lathe combination according to claim 1, wherein the foot is comprised of a bolt and means including a threaded connection adjustably holds the bolt relative to the carriage.

4. A power lathe combination according to claim 1, wherein the base member is planar and underlies the housing, the rear brace, and the lathe ways.

5. A power lathe combination according to claim 4, wherein resilient pads are confined between the housing and base member and between the rear brace and base member.

6. A power lathe combination according to claim 1, wherein the lathe ways are comprised of tubular elements, wherein the tool support carriage includes a frame having openings adapted to slidably receive the lathe ways, and wherein a threaded bolt is mounted adjustably relative to the carriage adapted to be moved against the lathe ways for holding the carriage longitudinally of the lathe ways.

7. A power lathe, comprising a planar base member, a housing mounted to one end of the base member and a rear brace mounted to the opposite end of the base member, a shaft rotatably journaled within the housing and projecting from the housing toward the rear brace, a pair of tubular lathe ways each supported between the housing and the rear brace parallel to one another and spaced from the base member, a tailstock opposed to and facing the shaft, a tool support carriage slidably mounted on said lathe ways between the tailstock and housing, said carriage including a frame having openings adapted to receive the lathe ways and lock means carried by the frame adapted to be moved against the lathe ways for holding the carriage longitudinally of the lathe ways, and a foot carried by said tool support carriage and adjustable to abut against the base member for restricting lateral movement of the lathe ways relative to the housing and rear brace.

References Cited

FOREIGN PATENTS

| 486,829 | 7/1920 | France. |
|---|---|---|
| 655,292 | 7/1951 | Great Britain. |

LEONIDAS VLACHOS, Primary Examiner